United States Patent
Van Moorselaar

[15] 3,700,703
[45] Oct. 24, 1972

[54] STEROIDS OF THE ANDROSTANE SERIES, METHODS OF PRODUCING THE SAME, PHARMACEUTICAL PREPARATIONS CONTAINING SAID COMPOUNDS AS ACTIVE INGREDIENTS AND METHODS OF PRODUCING THE SAID PREPARATIONS

[72] Inventor: Rudolf Van Moorselaar, Van Houtenlaan, Weesp, Netherlands

[73] Assignee: U.S. Philips Corporation, New York, N.Y.

[22] Filed: July 2, 1970

[21] Appl. No.: 56,122

Related U.S. Application Data

[63] Continuation of Ser. No. 743,647, July 10, 1968, abandoned.

[30] Foreign Application Priority Data

July 11, 1967 Great Britain..........31,786/67
June 25, 1968 Great Britain.......30,148/68

[52] U.S. Cl. .........260/397.4, 260/397.5, 260/397.3, 424/243
[51] Int. Cl..............................................C07c 169/20
[58] Field of Search....................................260/397.4

[56] References Cited

UNITED STATES PATENTS

| | | |
|---|---|---|
| 3,198,792 | 8/1965 | Reerink et al. ........260/239.55 |
| 3,408,369 | 10/1968 | Reerink et al. ..........260/397.3 |
| 3,423,433 | 1/1969 | Westerhof et al. ......260/397.3 |
| 3,452,004 | 1/1971 | Strike et al. ..........260/239.55 |
| 3,400,136 | 9/1968 | Holden.................260/397.43 |

Primary Examiner—Elbert L. Roberts
Attorney—Frank R. Trifari

[57] ABSTRACT

New 18-methyl-9$\beta$,10$\alpha$-steroids of the androstane series, methods of producing the same, pharmaceutical preparations containing said compounds as active ingredients and methods of producing the said preparations.

11 Claims, No Drawings

STEROIDS OF THE ANDROSTANE SERIES, METHODS OF PRODUCING THE SAME, PHARMACEUTICAL PREPARATIONS CONTAINING SAID COMPOUNDS AS ACTIVE INGREDIENTS AND METHODS OF PRODUCING THE SAID PREPARATIONS

This application is a continuation of U.S. Pat. application Ser. No. 743,647, filed July 10, 1968 and now abandoned.

The invention relates to 9β,10α-steroids of the formula I

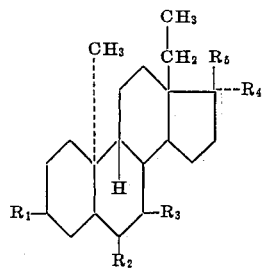

(I)

in which formula
$R_1$ represents a 3-keto-,
3-keto-4-dehydro-,
3-keto-1,4-bisdehydro-,
3-keto-4,6-bisdehydro-,
3-keto-1,4,6-trisdehydro-,
3-$H_2$-2,4,6-trisdehydro-,
3-OR-4-dehydro-,
3-OR-4,6-bisdehydro-,
3-OR'-3,5-bisdehydro-,
or a 3-OR'-2,4,6-trisdehydro system,
  wherein OR represents a hydroxy-, alkoxy- or acyloxy group,
  OR' represents an alkoxy- or acyloxy group, $R_2$ represents a hydrogen atom, a halogen atom, a lower alkyl group, or a spirocyclopropyl group.
  $R_3$ represents a hydrogen atom or 6,7-methylene group,
  $R_4$ represents a hydrogen atom, a lower alkyl-, alkenyl- or alkynyl- group, a fluorethynyl-, chloroethynyl or a bromoethynyl group and $R_5$ represents a hydroxy-, alkoxy- or an acyloxy group.

The compounds of the invention have very interesting endocrinological activities, so as for example orally progestational activity, anabolic activity with a favorable anabolic/androgenic ratio, anti-estrogenic activity, anti-androgenic activity and also have an influence on the secretion of the gonadotropic hormones. The compounds therefor are very useful in the treatment of gynaecological disorders and virilization problems with women, and may also be used as contraceptives.

In particular it was found that compounds of the general formulas represented hereinbelow, possess favorable and useful pharmacological properties: A. Compounds of the general formula II

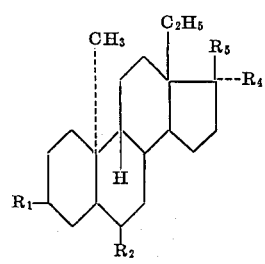

(II)

in which formula $R_1$ represents a
3-keto-4-dehydro-system,
3-keto-4,6-bisdehydro system,
3-keto-1,4,6-trisdehydro system,
3-acetoxy-2,4,6-trisdehydro system,
3-$H_2$-2,4,6-trisdehydro system.
$R_2$ represents a hydrogen-, chlorine- or fluorine atom,
$R_4$ represents a hydrogen atom, a lower alkyl-, alkenyl- or alkynyl group or a chloroethyl group and
$R_5$ represents a hydroxy group or an acyloxy group.
B. Compounds of the general formula III

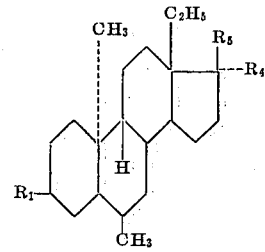

(III)

in which formula
$R_1$ represents a 3-keto-4-dehydro system, or a 3-keto-4,6-bisdehydro system,
$R_4$ represents a hydrogen atom, a lower alkyl-, alkenyl-, alkynyl- or chloroethynyl group, and
$R_5$ represents a hydroxy- or acyloxy group.
C. Compounds of the general formula IV

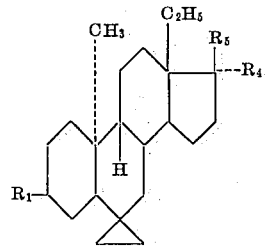

(IV)

in which formula
$R_1$ represents a
3-keto-4-dehydro system,
3-keto-1,4-bisdehydro system,
or a 3-OR-4-dehydro system
  wherein OR stands for an alkoxy- or acyloxy group,
  $R_4$ represents a hydrogen atom, a lower alkyl-, alkenyl- or
  alkynyl group or a chloroethynyl group and
  $R_5$ represents a hydroxy- or acyloxy group.

More specifically reference is made to the following list of compounds according to the invention, which compounds have proved to be of special interest:
17β-hydroxy-18-methyl-9β,10α-androst-4-en-3-one,
17β-hydroxy-18-methyl-9β,10α-androsta-4,6-dien-3-one,
17β-hydroxy-18-methyl-9β,10α-androst-4-en-3-one, 17 acetate,
6-chloro-16β-hydroxy-18-methyl-9β, 10α-androsta-4,6-dien-3-one, 17-acetate,
6-chloro-17β-hydroxy-18-methyl-9β,10α-androsta-1,4,6-trien-3-one 17-acetate,
6,6-ethylene-17β-hydroxy-18-methyl-9β-10α-androst-4-en-3-one 17-acetate,
6,6-ethylene-17α-ethyl-17β-hydroxy-18-methyl-9β,10α-androst-4-en-3-one 17-acetate,
6α-methyl-17β-hydroxy-18methyl-9β,10α-androst-4-en-3-one, 6-chloro-17α-ethynyl-17-hydroxy-18-methyl-9β,10α-androsta-1,4,6-trien-3-one 17-acetate,
6-chloro-17α-ethynyl-17-hydroxy-18-methyl-9β,10α-androsta-4,6-dien-3-one 17-acetate,
6-chloro-3,17β-dihydroxy-18-methyl-9β,10α-androsta-2,4,6-trien 3,17-diacetate,
6-chloro-17β-hydroxy-18-methyl-9β,10α-androsta-2,4,6-trien 6-fluoro-17β-hydroxy-18-methyl-9β,10α-androsta-4,6-dien-3-one 17-acetate
6-fluoro-17β-hydroxy-18-methyl-9β,10α-androsta-1,4,6-trien-3-one 17-acetate,
6-fluoro-3,17β-dihydroxy-18-methyl-9β,10α-androsta-2,4,6-trien-3,17-diacetate.
6α-methyl-17β-hydroxy-18-methyl-9β,10α-androst-4-en-3-one 17-acetate, 3,17β-dihydroxy-18-methyl-9β,1060-androsta-3,5-diene 3,17-diacetate,
6-chloro-17α-ethynyl-17-hydroxy-18-methyl-9β,10α-androst-4-en-3-one
17α-methyl-17-hydroxy-18-methyl-9β,10α-androst-4-en-3-one,
17α-methyl-17-hydroxy-18-methyl-9β,10α-androsta-4,6-dien-3-one,
6-chloro-17α-ethyl-17-hydroxy-18-methyl-9β,10α-androsta-4,6-dien-3-one,
6-chloro-17α-ethyl-17-hydroxy-18-methyl-9β,10α-androsta-1,4,6-trien-3-one,
17α-ethyl-17-hydroxy-18-methyl-9β,10α-androsta-1,4,6-trien-3-one,
17α-ethyl-17-hydroxy-18-methyl-9β,10α-androst-4-en-3-one,
17α-ethyl-17-hydroxy-18-methyl-9β,10α-androsta-4,6,-dien-3-one,
6-fluoro-17α-ethyl-17-hydroxy-18-methyl-9β,10α-endrosta-4,6-dien-3-one,
6-fluoro-17α-ethyl-17-hydroxy-18-methyl-9β,10α-androsta-1,4,6-trien-3-one,
6-chloro-17β-hydroxy-18-methyl-9β,10α-androst-4-en-3-one 17 acetate,
17α-ethynyl-17-hydroxy-18-methyl-9β,10α-androst-4-en-3-one,
17α-ethynyl-17-hydroxy-18-methyl-9β,10α-androsta-4,6-dien-3-one.
17α-allyl-17-hydroxy-18-methyl-9β,10α-androst-4-en-3-one,
17α-allyl-17-hydroxy-18-methyl-9β,10α-androst-4,6-dien-3-one,
17α-(2'-methallyl)-17-hydroxy-18-methyl-9β,10α-androst-4-en-3-one,
17α(2'-methallyl)-17-hydroxy-18-methyl-9β,10α-androsta-4,6-dien-3-one,
6-fluoro-17β-hydroxy-18-methyl-9β,10α-androst-4-en-3-one 17-acetate,
17α-vinyl-17-hydroxy-18-methyl-9β,10α-androst-4-en-3-one,
17α-vinyl-17-hydroxy-18-methyl-9β,10α-androsta-4,6-dien-3-one,
3-ethoxy-6-chloro-17β-hydroxy-18-methyl-9β,10α-androsta-3,5-dien, 17-acetate
17α-chloroethynyl-17-hydroxy-18-methyl-9β,10α-androst-4-en-3-one,
17α-chloroethynyl-17-hydroxy-18-methyl-9β,10α-androsta-4,6-dien-3-one,
3,17β-dihydroxy-18-methyl-9β,10α-androsta-2,4,6-trien 3,17-diacetate,
17β-hydroxy-17α-ethyl-18-methyl-5α,9β,10α-androstan-3-one.

The invention further relates to compounds of the general formula V

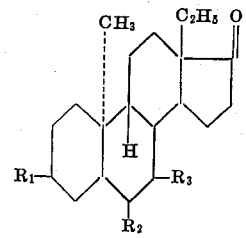

(V)

in which formula
R₁ represents a
3-keto-4-dehydro-,
3-keto-4,6-bisdehydro-,
3-keto-1,4-bisdehydro-,
3-H₂-2,4,6-trisdehydro-,
3-OR-4-dehydro-,
3-OR-4,6-bisdehydro-,
3-OR'-3,5-bisdehydro-,
or a 3-OR'-2,4,6-trisdehydro system,
wherein OR represents a hydroxy-, alkoxy- or acyloxy group and
OR' represents an alkoxy- or acyloxy group,
R₂ represents a hydrogen atom, a halogen atom, a lower alkyl group, or a spirocyclopropyl group and
R₃ represents a hydrogen atom or 6,7-methylene group.

These compounds are very interesting and valuable intermediate products in the preparation of compounds of following formula I, as mentioned hereinbefore, which latter compounds show the useful pharmacological properties described above. Of these intermediates, the following compounds deserve special interest:
18-methyl-9β,10α-androst-4-ene-3,17-dione,
18-methyl-9β,10α-androsta-4,6-diene-3,17-dione,
6,18-dimethyl-9β,10α-androsta-4,6-diene-3,17-dione
6-chloro-18-methyl-9β,10α-androsta-4,6-diene-3,17-dione.

The novel steroids of the invention are indicated as 9β,10α-steroids to indicate at which carbon atoms (9 and 10) the stereo-configuration deviates from the one of the normal steroids and in which sense (9β,10α in contradiction to the 9α,10β-configuration of the normal steroids).

The stereo-chemical configuration at the carbon atoms 8, 9, 10, 13 and 14 of the inventive compounds is the same as in dihydro-isolumisterone. Castells et al. have shown that dihydro-isolumisterone has the configuration 8β, 9β,10α, 13β and 14α (Proc. of the Chemical Society, 1958, page 7).

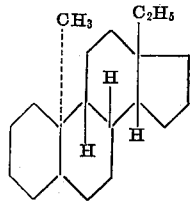

In the above given structural formula the β-position at the carbon atoms 8, 9 and 13 is indicated by a solid line, whereas the α-position at the carbon atoms 10 and 14 is indicated by a broken line. It should be observed that the configuration of the hydrogen atoms or substituents at the other carbon atoms may be either α,β or planar. Whether a hydrogen atom or a substituent at these other carbon atoms is in one of these positions is indicated by the chemical name only and not by the chemical formulas unless explicetely so expressed as in the case of a dotted line which always indicates the α-position.

When in this application the term "lower alkyl, alkenyl or alkynyl" is used, such a group contains from one to six carbon atoms e.g., methyl, ethyl, hexyl, vinyl, ethynyl, 2-methallyl, allyl.

When in this application the expression "acyloxy group" is used, said group contains from one to 20 carbon atoms and is preferably the acyloxy group of saturated or unsaturated aliphatic mono-, di- or tricarboxylic acid, mixed aliphatic-aromatic carboxylic acid, satured or unsaturated alicyclic or mixed aliphatic-alicyclic mono-carboxylic acid or aromatic carboxylic acid. Examples of these groups are: formoxy-, acetoxy-, propionoxy-, butyroxy-, the acyloxy group of oleic acid, palmitic acid, stearic acid, enanthoic acid, caproic acid, pivalic acid, succinic acid, malonic acid, benzoic acid, citric acid, p-hexyloxy-phenylpropionic acid, hexahydrobenzoic acid, phenylacetic acid, β-cyclopentylpropionic acid and β-cyclo-hexylpropionic acid.

In connection herewith it may be observed that the acyloxy group is preferably selected from acyloxy groups known to induce an elongated activity. Examples of these group are: 17-propionate, 17-decanoate, 17 -enanthate, 17-enanthoylacetate, 17-cyclohexylpropionate, 17-phenylpropionate, 17-phenyloxyphenylpropionate and 17-hemisuccinate.

When the term "alkoxy" is used, said group is preferably the alkoxy group of an aliphatic-, mixed aliphatic- aromatic or mixed aliphatic-alicyclic group. As such may be mentioned: methoxy, ethoxy, tert-butoxy, cyclohexyloxy, benzyloxy. The compounds of the invention may be prepared from 9β,10α-steroids by techniques known per se according to methods comprising the following processes:

a. A series of reactions to obtain a desired grouping at carbon atom 17, starting with compounds having an acyl group at carbon atom 17.

b. Introduction of substituents in the steroid nucleus.

It should be observed that this splitting up in processes indicated with (a) and with (b) does not mean that in the preparation of the inventive compounds the processes under (a) always precede those mentioned under (b).

The side-chain degradation and introduction of substuents may be carried out entirely or partially in a sequence opposite to the one represented above.

More particularly the compounds of the invention may be prepared by methods characterized in that a. A compound of the formula

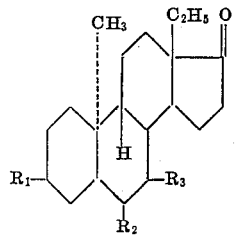

in which formula $R_1$ represents a 3-keto-4-dehydro-, of a 3-keto-4,6-bisdehydro system $R_2$ represents a hydrogen atom, a halogen atom, a lower alkyl group, or a spirocyclopropyl group and $R_3$ represents a hydrogen atom or 6,7-methylene group is subjected to a reduction reaction to produce the corresponding 17-hydroxy compound b. A compound of the formula

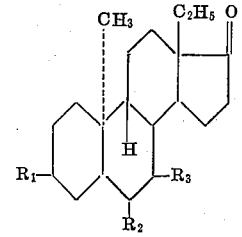

in which formula $R_1$ represents a
3-keto-4-dehydro-,
3-keto-4,6-bisdehydro-,
3-keto-1,4-bisdehydro-,
3-$H_2$-2,4,6-trisdehydro-,
3-OR-4-dehydro-,
3-OR-4,6-bisdehydro-,
3-OR'-3,5-bisdehydro-,
or a 3-OR'-2,4,6-trisdehydro system, wherein OR represents a hydroxy-, alkoxy- or a cycloxy group and OR' represents an alkoxy- or acyloxy group, $R_2$ represents a hydrogen atom, a halogen atom, a lower alkyl group, or a spirocyclopropyl group, and $R_3$ represents a hydrogen atom or 6,7-methylene group, is subjected to an alkylation reaction at carbon atom 17 to produce a compound of the formula

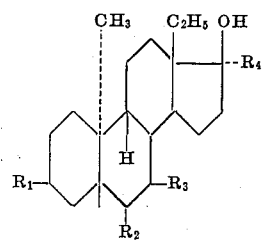

in which formula $R_1$, $R_2$ and $R_3$ have the meanings indicated above and $R_4$ represents a lower alkyl-, alkenyl- or alkynyl group, a fluoroethynyl-, chloro-ethynyl or a bromoethynyl group.

c. A compound of the formula

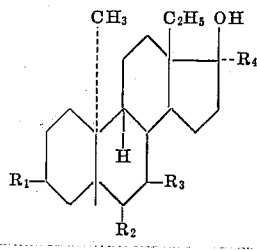

in which formula
$R_1$ represents a
3-keto-,
3-keto-4-dehydro-, 3-keto-1,4-bisdehydro-,
3-keto-4,6-bisdehydro-,
3-keto-1,4,6-trisdehydro-,
3-$H_2$-2,4,6-trisdehydro-,
3-OR-4-dehydro-,
3-OR-4,6-bisdehydro-,
3-OR'-3,5-bisdehydro-,
or a 3-OR'-2,4,6-trisdehydro system, wherein OR represents a hydroxy-, alkoxy- or acyloxy group and
OR' represents an alkoxy- or acyloxy group,
$R_2$ represents a hydrogen atom, a halogen atom, a lower alkyl group, or a spirocyclopropyl group,
$R_3$ represents a hydrogen atom or 6,7-methylene group and
$R_4$ represents a hydrogen atom, a lower alkyl-, alkenyl- or alkynyl-group, a fluoroethynyl-, choroethynyl or a bromoethynyl group,
is subjected to an esterification- or etherification reaction at carbon atom 17.

d. A compound of the formula

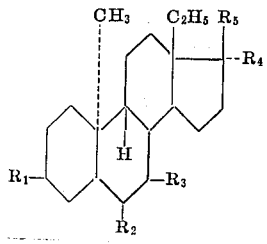

wherein $R_1$ represents
a 3-keto-4-dehydro system,
a 3-keto-4,6-bisdehydro system,
$R_2$ represents a hydrogen atom, a halogen atom, a lower alkyl group, or a spirocyclopropyl group,
$R_3$ represents a hydrogen atom or 6,7-methylene group,
$R_4$ represents a hydrogen atom, a lower alkyl-, alkenyl- or alkynyl group, a fluoroethynyl-, chloroethynyl or a bromoethynyl group and
$R_5$ represents a hydroxy-, alkoxy- or an acyloxy group, is subjected to a 1,2-dehydrogenation reaction to introduce a double bond between carbon atoms 1 and 2.

e. A compound of the formula

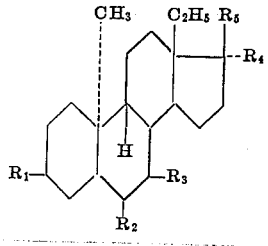

in which formula
$R_1$ represents a
3-keto-4-dehydro-,
3-keto-1,4-bisdehydro-
or a 3-OR-3,5-bisdehydro system,
wherein OR stands for an alkoxy group,
$R_2$ represents a hydrogen atom, a halogen atom or a lower alkyl group,
$R_3$ represents a hydrogen atom or 6,7-methylene group, $R_4$ represents a hydrogen atom, a lower alkyl-, alkenyl- or alkynyl group, a fluoroethynyl-, chloroethynyl or a bromoethynyl group and
$R_5$ represents a hydroxy-, alkoxy- or an acyloxy group, is subjected to a 6,7-dehydrogenation reaction, to introduce a double bond between the carbon atoms 6 and 7.

f. A compound of the formula

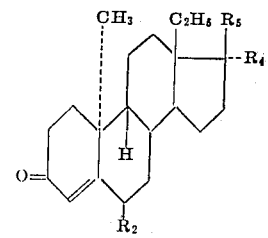

wherein $R_2$ represents a hydrogen atom, a halogen atom or a lower alkyl group,
$R_4$ represents a hydrogen atom, a lower alkyl-, alkenyl- or alkynyl group, a fluoroethynyl-, chloroethynyl or a bromoethynyl group and
$R_5$ represents a hydroxy-, alkoxy- or an acyloxy group, is subjected to an etherification or esterification reaction at the 3-keto oxygen atom to produce a compound of the formula

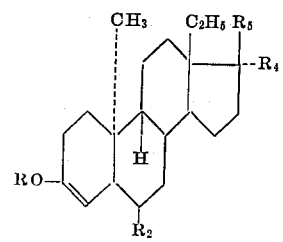

in which formula $R_4$ and $R_5$ have the above indicated meanings and OR represents an acyloxy group, whereby $R_2$ represents a hydrogen atom or an alkyl group or OR represents an alkoxy group, whereby $R_2$ represents a hydrogen atom, a halogen atom or an alkyl group.

g. A compound of the formula

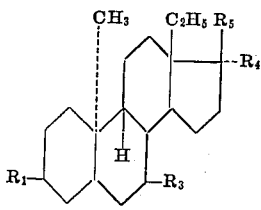

in which formula
$R_1$ represents a
3-keto-4-dehydro system,
3-alkoxy-3,5-bisdehydro system,
or a 3-acyloxy-3,5-bisdehydro system,
$R_3$ represents a hydrogen atom or a 6,7-methylene group, whereby the carbon atom at position 6 at least contains one hydrogen atom,
$R_4$ represents a hydrogen atom, a lower alkyl-, alkenyl- or alkynyl group, a fluoroethynyl-, chloroethynyl or a bromoethynyl group and $R_5$ represents a hydroxy-, alkoxy- or an acyloxy group, is subjected to a halogenation reaction to introduce halogen at carbon atom 6.

h. A compound of the formula

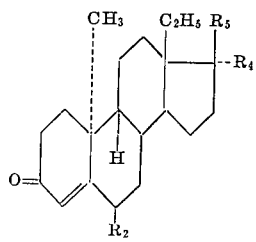

in which formula
  $R_2$ represents a hydrogen or a halogen atom,
  $R_4$ represents a hydrogen atom, a lower alkyl-, alkenyl- or alkynyl group, a fluoroethynyl-, chloroethynyl or a bromoethynyl group and
  $R_5$ represents a hydroxy-, alkoxy- or an acyloxy group, is subjected to a methylenation reaction to produce the corresponding $6\beta,7\beta$-methylene-$9\beta,10\alpha$-steroid.

i. A compound of the formula

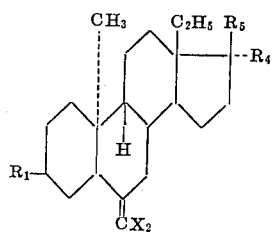

in which formula
  $R_1$ represents a 3-keto-4-dehydro system or a 3-keto-4,6-bisdehydro system
  $R_4$ represents a hydrogen atom, a lower alkyl-, alkenyl- or alkynyl group, a fluoroethynyl-, chloroethynyl or a bromoethynyl group and
  $R_5$ represents a hydroxy-, alkoxy- or an acyloxy group and X represents a hydrogen atom or a halogen atom,
is catalytically hydrogenated to produce the corresponding 6-methyl steroid compound.

k. A compound of the formula

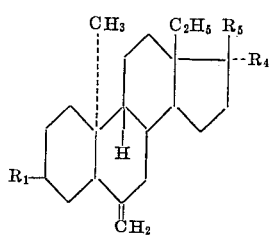

in which formula
  $R_1$ represents a 3-keto-4-dehydro- or a 3-keto-1,4-bisdehydro system,
  $R_4$ represents a hydrogen atom, a lower alkyl-, alkenyl- or alkynyl group, a fluoroethynyl-, chloroethynyl or a bromoethynyl group and
  $R_5$ represents a hydroxy-, alkoxy- or an acyloxy group, is reacted with a methylenating agent to produce the corresponding 6,6-ethylene steroid compound.

1. A compound of the formula

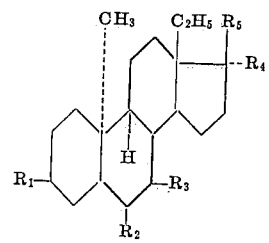

in which formula
  $R_1$ represents a
    3-keto-,
    3-keto-4-dehydro-,
    3-keto-1,4-bisdehydro-,
    3-keto-4,6-bisdehydro-,
    3-keto-1,4,6-trisdehydro-,
    3-$H_2$-2,4,6-trisdehydro-
    3-OR-4-dehydro-,
    3-OR-4,6-bisdehydro-
    3-OR'-3,5-bisdehydro-,
  or a 3-OR'-2,4,6-trisdehydro system
  wherein OR represents a hydroxy-, alkoxy- or acyloxy group,
    OR' represents an alkoxy- or acyloxy group,
    $R_2$ represents a hydrogen atom, a halogen atom, a lower alkyl group, or a spirocyclopropyl group,
    $R_3$ represents a hydrogen atom, or 6,7-methylene group,
    $R_4$ represents an alkenyl- or alkynyl group and
    $R_5$ represents a hydroxy-, alkoxy- or an acyloxy group, is catalytically hydrogenated at carbon atom 17 to produce a compound of the formula

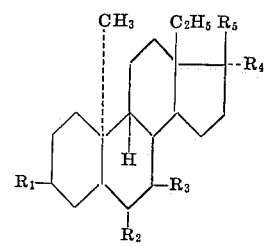

in which formula $R_1$, $R_2$, $R_3$ and $R_5$ have the above mentioned meanings and $R_4$ represents an alkyl- or alkenyl group.

m. A compound of the formula

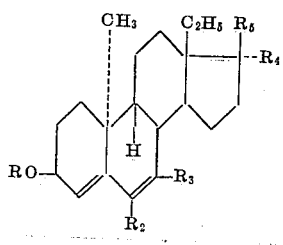

in which formula
  $R_2$ represents a hydrogen atom, a halogen atom or a lower alkyl group,
  $R_3$ represents a hydrogen atom or a 6,7-methylene group,
  $R_4$ represents a hydrogen atom, a lower alkyl-, alkenyl- or alkynyl group, a fluoroethynyl-, chloroethynyl or a bromoethynyl group and $R_5$ represents a hydroxy-, alkoxy- or an acyloxy group and OR stands for a hydroxy-, alkoxy- or acyloxy group, is subjected to a reaction to split off the group ROH whereby a compound of the formula

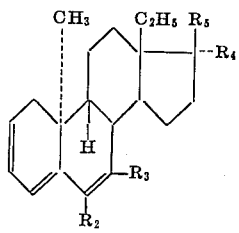

in which formula $R_2, R_3, R_4$ and $R_5$ have the above mentioned meanings, is produced.

n. A compound of the formula

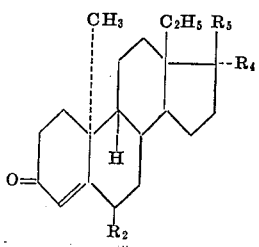

in which formula $R_2$ represents a hydrogen atom, a halogen atom or an alkyl group, $R_4$ represents a hydrogen atom, a lower alkyl-, alkenyl- or alkynyl group, a fluoroethynyl-, chloroethynyl or a bromoethynyl group and $R_5$ represents a hydroxy-, alkoxy- or an acyloxy group, is subjected to an esterification reaction at the 3-keto oxygen atom to produce a compound of the formula

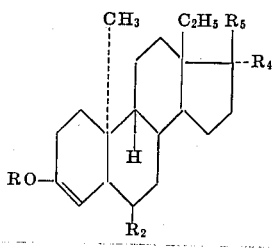

and in which formula $R_2$, $R_4/R_5$ have the meanings indicated above and OR stands for an acyloxy group.

The intermediate products of the formula V, mentioned hereinbefore, may be repaired according to methods known per se for producing analogous compounds.

Thus the intermediate products according to the invention may be prepared e.g. by subjecting a compound of the formula

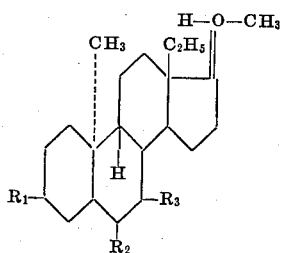

in which formula $R_1$ represents a 3-keto-4-dehydro-, or a 3-keto-4,6-bisdehydro system, $R_2$ represents a hydrogen atom, a halogen atom, a lower alkyl group, or a spirocyclopropyl group, and $R_3$ represents a hydrogen atom or 6,7-methylene group, to an oxidation reaction whereby a compound of the formula

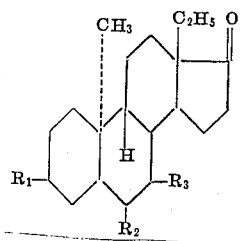

in which formula $R_1$, $R_2$ and $R_3$ have the above given meanings, is produced.

A more detailed description of the methods enumerated hereabove, together with a description of the reactions for the preparation of the starting products of these methods will be given below, whereby the letters a-n refer to the corresponding paragraphs indicated above.

ad *a*

The reduction reaction may be carried out for example, with a complex metal hydride such as $LiAlH_4$ or $NaBH_4$ or with a complex metal hydride of which one to three hydrogen atoms are substituted by alkoxy groups having from one to five carbon atoms. The reaction takes place in the presence of a solvent such as ethers and alcohols and at a reaction temperature raising from $-10°C$ initially to the boiling point of the solvent at the end of the process.

In order to prevent the conversion of the 3-keto group present in the starting material to a 3-hydroxy group during the reduction process, the 3-keto group may be protected. This can be done, for example, by selective ketalising the same with ethylene glycol, followed by hydrolysis of the 3-ketal group after the main reaction has taken place or by reaction of the 3-keto-group with pyrrolidine, followed by hydrolysis of the obtained 3-enamine, after the reduction process.

If the 3-keto group is not protected, both a reduction of this group to a hydroxy group and the reduction of the 17-keto oxygen atom to a 17-hydroxy group will occur in certain cases. The thereby produced 3,17-diol steroid compound is subjected to a selective oxidation reaction to convert the 3-ol group to a 3-keto oxygen atom. This can be done e.g., by reaction with 2,3-dichloro-5,6-dicyanobenzoquidone, (DDQ). Thereto the 3,17-diol steroid compound is dissolved in a suitable solvent such as an aromatic hydrocarbon or an ether, and preferably in benzene or dioxan, and reacted with a solution of DDQ in an aromatic hydrocarbon, preferably benzene, at a reaction temperature which may vary between $15°–40°C$.

ad *b*

The alkylation may be carried out with several alkylating agents known per se. Thus the alkylation may be realized with a Grignard reagent of the formula R–Mg–X, in which formula R represents an alkyl-, alkenyl- or alkynyl group and X represents a halogen atom, or with a compound of the formula MeR, in which formula Me represents an alkalimetal, such as Li, and R represents an alkyl-, alkenyl-, alkynyl-, fluoroethynyl-, chloroethynyl- or a bromoethynyl group.

The alkylation reaction takes place in the presence of a solvent such as ethers, or mixtures of ethers with liquid ammonia at a reaction temperature varying from about −35° C to room temperature. The reaction with the alkylating agent results in an intermediate metal complex of the general formula

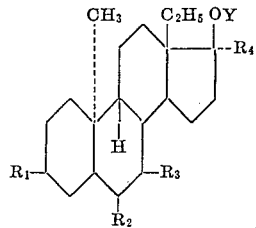

in which formula
$R_1$ represents a
3-keto-4-dehydro-,
3-keto-4,6-bisdehydro-,
3-keto-1,4-bisdehydro-,
3-$H_2$-2,4,6-trisdehydro-,
3-OR-4-dehydro-,
3-OR-4,6-bisdehydro-,
3-OR'-3,5-bisdehydro-,
or a 3-OR'-2,4,6-trisdehydro system,
wherein OR represents a hydroxy-, alkoxy- or acyloxy group and
OR' represents an alkoxy- or acyloxy group,
$R_2$ represents a hydrogen atom, a halogen atom, a lower alkyl group, or a spirocyclopropyl group.
$R_3$ represents a hydrogen atom or 6,7-methylene group,
$R_4$ represents a hydrogen atom, a lower alkyl-, alkenyl- or alkynyl group, a fluoroethynyl-, chloroethynyl or a bromoethynyl group and
Y represents an alkalimetalatom or the group — MgX in which group X represents a halogen atom, which complex is decomposed in an aqueous medium to obtain a compound of the formula

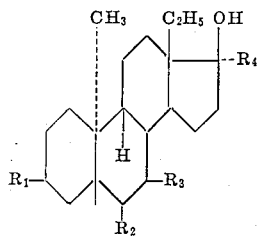

in which formula $R_1$, $R_2$, $R_3$ and $R_4$ have the meanings represented above.

It should be observed that when the starting product of the reaction mentioned under $b$ contains a 3-keto group, in certain cases this group is preferably protected during the alkylation reaction in order to prevent the attack of the 3-keto group by the alkylating agent. The protection of the 3-keto group can be realized for example, by reaction with ethylene glycol or with pyrrolidine, whereby the corresponding 3-ketal- or 3-enamine compound is produced, respectively. After the alkylation reaction, the 3-ketal or 3-enamine group is rearranged to the 3-keto group by hydrolysis.

ad $c$

The esterification may be carried out, for example, by the reaction of the 17-hydroxy steroids with acids, acid anhydrides or acid chlorides in the presence of, for example, a catalyst (such as p-toluene sulphonic acid and pyridine-HCL) or acid binding reagents (such as organic bases f.e. collidine)

The etherification reaction may be carried according several well known methods and may be exemplified by the following:

1. Reaction with an alcohol in the presence of a catalyst such as an inorganic acid or p-toluene sulphonic acid.
2. Reaction with diazomethane in the presence of a catalytic amount of fluoboric acid.
3. Reaction with a reactive ester of an aliphatic alcohol and an inorganic acid (f.e. diethylsulphate) in the presence of an acid binding reagent (f.e. inorganic or organic bases such as NaOH, pyridine, $Ag_2O$).
4. Reaction with an alkylhalogenide or aralkylhalogenide in the presence of $Ag_2O$.
5. Reaction with alkenes f.e. isobutene in the presence of a Lewis acid.
6. Reaction with dihydropyran or dihydrofuran in a weakly acidic, weakly alkaline or neutral medium.

ad $d$

Introduction of $\Delta^1$-double bond a. by microbiological 1-dehydrogenation e.g., with Corynebacterium Simplex, A. Nobile, et. al., J. Am. Chem. Soc, 77, 4184 (1955), b. by direct 1-dehydrogenation
1. with iodine pentoxide or periodic acid, Dutch Patent Application 215.154 and 211.626
2. with selenium dioxide, J.H. Fried, et al., J. Am. Chem. Soc. 81, 1235 (1959) A. Bowers, et al., J. Am. Chem. Soc. 81, 5991 (1959),
3. with chloranil e.g., for the conversion of 3-keto-$\Delta^4$ into 3-keto-$\Delta^{1,4,6}$-steroids, E.J. Agnello and G.D. Laubach, J. Am. Chem. Soc. 82, 4293 (1960),
4. with 2,3-dichloro-5,6- dicyanobenzoquinone, D. Burn, et al., Proc. Chem. Soc. 1960, 14,
5. dehydrogenation of 3-keto-steroids with lead tetra acetate, R.L. Clarke, J. Am. Chem. Soc. 77, 661 (1955), R. Joly, Bull, Soc., 366 (1958),.

c. by selective 1,2-dehydrohalogenation of 2-halo-3keto-steroids e.g., with an organic base such as collidine or with lithiumbromide and lithium carbonate in dimethyl-formamide, C. Djerassi, J.Am. Chem. Soc. 71, 1003 (1949).

ad $e$ Introduction of $\Delta^6$-double bond a. by direct 6-dehydrogenation of 3-keto-$\Delta^4$-9$\beta$, 10$\alpha$-steroids
1. with substituted benzoquinones, such as chloranil, (E.J. Agnello and G.D. Laubach, J. Am. Chem. Soc. 82, (1960) or 2,3-dichloro-5,6-dicyanobenzoquinone Bowers, J. Am. Chem. Soc. 81, 5991 (1959)), (H. J. Ringold and A. Turner, Chem. and Ind. 1962, 211)
2. with mangenese dioxide, (F. Sondheimer, et al., J. Am. Chem. Soc. 75, 5932 (1953)), b. by acidic isomerisation of 3-keto-$\Delta^{4,7}$-steroids in a waterfree and alkanol containing medium e.g., with hydrochloric acid in isopropanol, which may contain methylenedichloride (P. Westerhof and E.H. Reerink, Rec. Trav. Chim. 79, 771 (1960)), c. by reaction of a $\Delta^{3,5}$-3-enolether-steroid with 2,3-dichloro-5,6-dicyanobenzoquinone, German Pat. No. 1.044.077, d. by dehydration of a 3-keto-4-dehydro-6-halo-7-hydroxysteroid, (preferably the 6$\beta$-chloro compound) e.g., with hydrochloric or hydrobromic acid (K. Brückner, Chem. Ber. 94, 1225 (1961)). The starting compounds of this reaction may be prepared by reaction of a 3-keto-$\Delta^{(1)}$),-4,6-dehydro-steroid with a per-acid, such as monoperphtalic acid according to a method described by Brückner, Chem. Ber. 94, 1225 (1961), which reaction results in formation of the corresponding 6,7-epoxide, followed by reaction of the compound thus produced with a hydrogen halide, such as hydrogen chloride, hydrogen fluoride or hydrogen bromide (Brückner, ibidem). The corresponding 6-chloro-7-hydroxy-steroids may also be produced by reacting a 3-keto-$\Delta^{(1)},4,6$-steroid with chromylchloride.

e. Furthermore they may be prepared by reaction of $\Delta 3,5$-3-enol-ether-6-halo-steroids with a halogen substituted benzoquinone such as 2,3-dichloro-5,6-dicyanobenzoquinone, Soutch African Pat. specification No. SA 62/3118.

f. Oxidation of 3-enolether-$\Delta 3,5$-6-halo-steroids with tert. butylchromate gives 3-keto-$\Delta 4,6$-6-halo-steroids, K. Yasuda, Chem. Pharm. Bull. 11, 1167 (1963)

g. By halogenation of a $\Delta 3,5$-3-enolether (or ester) compound having at position 6 a hydrogen atom, a halogen atom or an alkyl group, followed by dehydrohalogenation to form a 3-keto-4,6-bisdehydro compound which carries at position 6 a hydrogenation, a halogen atom or an alkyl group.

ad $f$ Introduction of the 3-enolether- (or 3-enolester)-$\Delta 3,5$-system by a. enoletherification of a 3-keto-$\Delta 4$ (or a 3-keto-$\Delta 5$) steroid with an alcohol in the presence of a catalyst, e.g. with benzylalcohol in the presence of p-toluene sulphonic acid. (S. Bernstein, et al., J. Org. Chem. 18, 1166 (1953)) or with an orthoformate ester in the presence of a catalyst, e.g. with ethylorthoformate and hydrochloric acid (A. Serini, et al., Ber. 71, 1766 (1938)) or ethylorthoformate with p-toluenesulphonic acid (R. Gardi, et al., J. Org. Chem. 27, 668 (1962)) and A.D. Cross, et al., Steroids 6, 198 (1963) or with a dialkoxy propane, e.g. with dimethoxypropane in methanol-dimethylformamide, in the presence of a catalyst such as p-toluenesulphonic acid (A.L. Nussbaum, et al., J. Org. Chem. 26, 3925 (1961))

b. enolesterification can be carried out by means of e.g. isopropenylacetate in the presence of an acid catalyst such as p-toluene sulphonic acid or sulphuric acid or by means of acetic anhydride in the presence of e.g. p-toluenesulphonic acid.

ad $g$ Introduction of 6-halogen a. by substitutuion halogenation at carbon atom 6 with N-halo imides such as bromosuccinimide or with halogens such as bromine, (C. Djerassi, et al., J. Am. Chem. Soc. 72, 4534 (1950)), b. by halogenation of a $\Delta 3,5$-3-enolether steroid with e.g. halogens, such as chlorine, bromine, (L.H. Knox, J. Am. Chem. Soc. 82, 1230 (1960)), or with N-halo imides, such as bromosuccinimide (Lit. idem.) or with perchlorylfluoride (S. Nakanishi, J. Am. Chem. Soc. 81, 5259 (1959)), c. by halogenation of a $\Delta 3,5$-3-enolester steroid with e.g. halogens, such as chlorine, (H.H. Inhoffen, C.A. 53, 456 (1959)) or with N-halo imides (C. Djerassi, J. Am. Chem. Soc. 77, 3827 (1955)) or with perchlorylfluoride, (B.M. Bloom, Chem.a.Ind. 1959, 1317).

ad $h$ Introduction of a 6,7-methylene group

A steroid compound comprising a 6-dehydro double bond may be methylenated e.g. by reaction with dimethyl sulphoxonium methylide to produce the corresponding 6,7-methylene compound. The reaction is carried out in the presence of a solvent e.g. dimethyl sulphoxide or ethers such as dioxan or tetrahydrofuran at a reaction temperatur of 0–80°C and preferably of 15°–30C.

The dimethyl sulphoxonium reagent is prepared by reaction of trimethyl sulphoxonium iodide with a base e.g. alkalihydrides in the presence of a solvent such as dimethyl-sulphoxide.

ad $i$ Catalytic hydrogenation of a 6-methylene or 6-dihalomethylene group

The catalytic hydrogenation can be performed by the use of several well-known hydrogenation catalysts such as Palladium suspended on e.g. carbon black, $BaSO_4$, $CaCO_3$ or $SrCO_3$.

The starting materials of the method $i$, wherein X represents a hydrogen atom may be prepared, for example, by the so-called Vilsmeyer reaction.

According to the Vilsmeyer reaction a 3-alkoxy-3,5-diene-9$\beta$,10$\alpha$-steroid is reacted with dimethylformamide and phosgene. After hydrolysis of an intermediately produced iminium compound the corresponding 6-formyl-3-alkoxy-3,5-diene is produced.

By catalytic reduction or by reduction with sodium- or lithium borohydride the corresponding 6-hydroxymethyl-3-alkoxy-3,5-diene is obtained. Subsequent treatment of the latter compound with aqueous diluted acid results into hydrolysis of the enolether group and simultaneously of dehydration of the 6-hydroxymethyl group. Preferably the reaction is carried out in a medium of aqueous diluted acetic acid or hydrochloric acid, or sulphuric acid in a medium of a lower alkanol, e.g. methanol.

The starting compounds wherein X represents a chlorine or bromine atom may be prepared by reacting an enolether of a 3-keto-4-dehydro steroid with tetrahalomethane e.g. with trichloromonobromomethane or with tetra-bromomethane and splitting off hydrogen chloride or hydrogen bromide respectively from the 3-keto-4-dehydro-6-trichloro (or tribromo)-methyl-steroid (Lissberg, Tetrahedron 9, 149 (1960)). The latter part of the reaction is preferably carried out with a basic anion exchanger of the type "Dowex-1" or with alkali alkoxide in alkanol, e.g. with sodium methoxide in boiling methanol.

ad $k$ Methylenation of a 6-methylene group

Methylenation agents which can be used to convert a 6-methylene group into a 6,6-ethylene group are, for example dimethyl-sulphoxonium methylide and dimethylsulphonium methylide. The reaction is carried out in an a-protic polar solvent such as dimethyl-sulphoxide.

ad $l$

The hydrogenation reaction according to method 1 is carried out at room temperature, preferably with a catalyst e.g. palladium suspended on a carrier e.g. $CaCO_3$, $BaSO_4$, $SrSO_4$ or carbon black, in the presence of a suitable solvent such as ethers (f.e. dioxan and tetrahydrofuran) or aromatic hydrocarbons (f.e. toluene).

ad $m$

In order to splitt off the group ROH the starting compound is treated with an acid e.g. hydrochloric acid, in the presence of an alcohol e.g. ethanol. It may be advantageous in certain cases to perform the reaction in a mixture of an alcohol and carbon tetrachloride.

ad $n$ Introduction of the 3-enolester-$\Delta^{2,4,6}$-system by enolesterification of a 3-keto-$\Delta^{4,6}$-9$\beta$,10$\alpha$-steroid compound for example, by means of a. a reaction of a 3-keto-$\Delta^{4,6}$-9$\beta$,10$\alpha$-steroid with an isopropenylester such as isopropenyl acetate in the presence of a catalyst e.g. p-toluene sulphonic acid British Pat. specification No. 893.237, b. a reaction of a 3-keto-Δ⁴,⁶-9β,10α-steroid with a carboxylic acid anhydride and an acid halogenide e.g. acetic acid anhydride and acetylchloride I.M. Heilbron (J.Chem. Soc. 1938, 869), c. enolesterification of a 3-keto-Δ⁴,⁶-6-halogeno-9β,10α-steroid for example, by reaction with an acid anhydride and an acid halogenide, if desired in the presence of a catalyst f.e. by reaction with acetic acid anhydride and acetylchloride in the presence of pyridine.

Oxidation reaction at carbon atom 17 to prepare the intermediate compounds according to the invention.

The oxidation reaction for the production of the intermediate compounds may be carried out with a suitable oxidizing agent such as ozone or chromic acid.

Thereto a compound of the formula

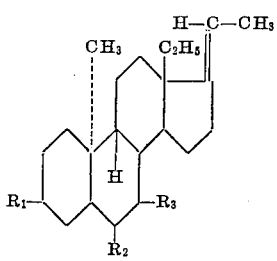

in which formula
  R₁ represents a 3-keto-4-dehydro-, or a 3-keto-4,6-bisdehydro system,
  R₂ represents a hydrogen atom, a halogen atom, a lower alkyl group, or a spirocyclopropyl group, and
  R₃ represents a hydrogen atom or a 6,7-methylene group, is ozonized at carbon atom 17 by passing a stream of oxygen and ozone through a solution of the steroid compound in a suitable solvent f.e. methylene chloride, ethyl acetate or chloroform, at a temperature of −70°C till −80°. When chloroform is used as the solvent, the reaction temperature should be raised till −60°C (melting point chloroform is −63,5°C). The reaction has to be carried out in the presence of a moderator such a pyridine to ensure that a selective ozonization at carbon 17 will occur.

The formed compound is decomposed by reduction with a reducing agent such as zinc with acetic acid to produce a compound of the formula

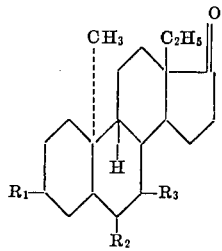

in which formula R₁, R₂ and R₃ have the meanings indicated above. The starting compounds of the oxidation reaction may be prepared according to the following procedure:

A compound of the formula

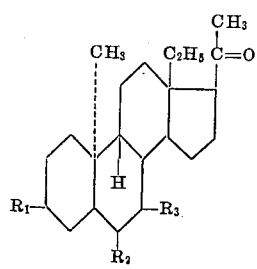

in which formula
  R₁ represents a 3-keto-4-dehydro-, or a 3-keto-4,6-bisdehydro system,
  R₂ represents a hydrogen atom, a halogen atom, a lower alkyl group, or a spirocyclopropyl group, and
  R₃ represents a hydrogen atom or 6,7-methylene group, is subjected to a reduction reaction, for example with a complex metal-hydride, such as lithium-aluminum hydride, to produce a compound of the formula

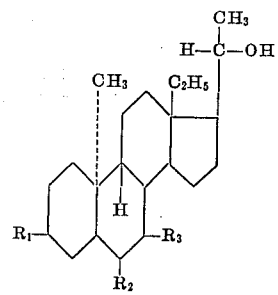

in which formula
  R₁ represents a 3-hydroxy-4-dehydro-, or a 3-hydroxy-4,6-bisdehydro system,
  R₂ represents a hydrogen atom, a halogen atom, a lower alkyl group, or a spirocyclopropyl group, and
  R₃ represents a hydrogen atom or 6,7-methylene group.

The reaction is carried out in the presence of a solvent, such as ethers f.e. tetrahydrofuran and diisopropylether, at a temperature which may vary during the reaction from 0°C till the boiling point of the solvent.

The obtained compound is dissolved in a suitable solvent such as an aromatic hydrocarbon f.e. benzene, and subsequently reacted at room temperature with 2,3-dichloro-5,6-dicyano-benzo-quinone to convert the 3-hydroxy group into the 3-keto group. The latter compound is tosylated and subsequently detosylated to produce a compound of the formula

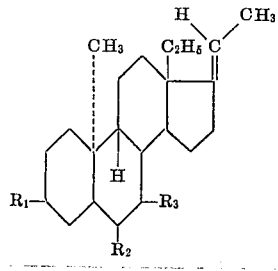

in which formula
  R₁ represents a 3-keto-4-dehydro-, or a 3-keto-4,6-bisdehydro system, $R_2$ represents a hydrogen atom, a halogen atom, a lower alkyl group, or a spirocyclopropyl group, and $R_3$ represents a hydrogen atom or 6,7-methylene group.

The tosylation and detosylation reaction may be carried out in two steps according the following procedure.

1. The 20-hydroxy compound mentioned herebefore is reacted at room temperature with p-toluene sulfochloride in the presence of an acid binder f.e. pyridine, whereby said acid binder also acts as a solvent for the reagents and the reaction products.
2. The formed tosylate is isolated, dissolved in pyridine and finally refluxed for several hours (boiling point of pyridine 113°C) to effect the detosylation.

Applicants have found however that the tosylation and detosylation reaction may be carried out in one step whereby the intermediately formed tosylate is not isolated and not dissolved again.

In a preferred embodiment of the invention the tosylation and detosylation is carried out by reacting the 20-hydroxy compound with p-toluene sulfochloride in the presence of an acid binder such as pyridine or collidine at a reaction temperature of 50°–65° C.

The compounds according to the invention may be worked up to pharmaceutical preparations in the usual manner.

Thus they may be compounded to tablets for oral take-up by mixing the compounds with inert carrier materials such as potato starch, lactose, together with fillers and/or binders or solid lubricants e.g. magnesium stearate, a carboxy-methyl cellulose. Injection liquids can be produced by dissolving a methylene chloride solution of an active compound in arachid oil and by subsequent evaporation of methylene chloride, while working under sterile conditions or by any other suitable method e.g. the one as described in the Examples.

The invention will now be explained in greater detail in the examples which follow:

EXAMPLE I

17β-hydroxy-18-methyl-9β,10α-androst-4-en-3-one a. 18-methyl-20-hydroxy-9β,10α-pregn-4-en-3-one (Compound I)

In a nitrogen atmosphere and with stirring 14,4 g of lithium-aluminumhydride were suspended in 400 ml of absolute tetrahydrofuran. To this suspension a solution of 40 g of 18-methyl-retroprogesterone in 1-1 of absolute tetrahydrofuran was added slowly in the course of half an hour at room-temperature. Then the reaction-mixture was refluxed for 1½ hrs., cooled to 0° and the excess of lithiumaluminum-hydride was decomposed with ethylacetate and subsequently with ethylalcohol. A saturated solution of sodiumsulphate and solid sodiumsulphate were then added. The reaction mixture was subsequently filtrated, the residue washed with methylenechloride and the filtrate evaporated under reduced pressure. The residue of the filtrate was dissolved in 200 ml of absolute dioxan and 1800 ml of absolute benzene and to this solution a solution of 32 g of DDQ (= 110%) in 600 ml of absolute benzene was added. After standing for 20 hrs in a nitrogen atmosphere the reaction-mixture was filtrated through sodium-sulphate. The solid material was washed with benzene. The filtrate was then washed successively with 800 ml portions of water (3x), 800 ml portions of a 1n sodiumhydroxide solution (3x) and again with 800 ml portions of water (3x). After drying and filtration the solvent was removed under reduced pressure yielding 40.35 g of 18-methyl-20-hydroxy-9β,10α-pregn-4-en-3-one (compound I)

b. 18-methyl-9β,10α-pregna-4,17-dien-3-one (compound II)

40.35 g of compound I (crude) were dissolved in 200 ml of dry pyridine. To this solution 35.2 g of p-toluenesulfochloride were added and the reaction mixture was kept at 50° C in a nitrogen atmosphere for 20 hrs. The reaction mixture was then poured out into 2-1 of ice-water and carefully acidified with concentrated hydrochloric acid till pH=2. Extraction was performed with 800 ml portions of benzene - ether (1:1) (3×). The combined extracts were washed successively with 800 ml portions of water (3×), 800 ml portions of a concentrated sodiumbicarbonate solution (3×) and again with 800 ml portions of water (3×). After drying and filtration the solvent was removed under reduced pressure. The residue was chromatographed through a column of 2 kg of silicagel (eluens: benzene-acetone), yielding 34.6 g of compound II.

c. 18-methyl-9β,10α-androst-4-ene-3,17-dione (compound III)

34.6 g of crude compound II were dissolved in 1600 ml of methylenechloride and 14 ml of pyridine. After cooling to −78° a mixture of ozone and oxygen was passed through the solution until 125mmols of ozone had been absorbed (115 percent of the theoretical quantity of ozone). Then the ozonization mixture was decomposed by the addition of 40 ml of acetic acid and 8 g of zinc dust. With vigorous stirring the temperature was slowly raised to room temperature. The mixture was filtered over sodiumsulfate. The filtrate was washed successively with 800 ml portions of water (2×), with 800 ml portions of a saturated solution of sodiumbicarbonate (3×) and again with 800 ml portions of water (3×). After drying and filtration the solvent was removed under reduced pressure giving a product (34.5g) which was chromatographed on 1500 g of silicagel (eluens benzene-acetone).

Yield: 16.4 g of 18-methyl-9β,10α-androst-4-ene-3,17-dione.

Physical constants of pure compound III are:
m.p. 124°–124.5°: $\epsilon$ 241 = 16200 (methanol);
$[\alpha]_D^{25} = -115°$ ($c = 1.07$ in $CHCl_3$).

d. 17β-hydroxy-18-methyl-9β,10α-androst-4-en-3-one 2.5 g of 18-methyl-retrodione (III) were dissolved in 45 ml of absolute tetrahydrofuran. This solution was added dropwise to a cooled (0°) suspension of 1.2 g. of lithiumaluminumhydride in 125 ml of absolute tetrahydrofuran. The reaction was carried out in a nitrogen atmosphere and was well stirred. After refluxing for 1 hour the solution was cooled to 0° and the excess of lithiumaluminumhydride was decomposed with the use of ethyl-acetate. After adding of a saturated solution of sodiumsulphate and solid sodiumsulphate the solution was filtered through sodiumsulphate. The filtrate was concentrated in vacuo to dryness. The residue was dissolved in 100 ml of absolute benzene. To this solution 2.4 g of DDQ (125 percent) in 50 ml of absolute benzene were added. After standing for 20 hrs at room temperature in a nitrogen atmosphere the reaction mixture was filtered through sodiumsulphate and poured out into 300 ml of a 1n sodiumhydroxide solution. After separation the organic layer was washed with 250 ml of a 1n sodiumhydroxide solution (3×) and with water. After drying and filtration the solvent was removed under reduced pressure.

The residue (1.9 g) was chromatographed through a column of 40 g of silicagel(eluens: benzene - petroleum ether or benzene and benzene-ether).

Yield 1.1 g. Crystallization from acetone-hexane gave pure 17β-hydroxy-18-methyl-9β,10α-androst-4-en-3-one.

m.p. 179°–179.5°; $\epsilon_{242} = 16,400$ (methanol)

EXAMPLE II

17β-Hydroxy-18-methyl-9β,10α-androst-4-en-3-one 17-acetate

Five hundred forty mg of 18-methyl retrotestosterone (Example I) were dissolved in 3 ml of pyridine. To this solution 1.4 ml of aceticanhydride were added.

After standing for 16 hrs in a nitrogen atmosphere at room-temperature the solution was stirred with ice-water for 1 hour. After extraction with 100 ml portions of ether-benzene (1:1) the combined organic layers were washed successively with: 100 ml portions of water (3×), 100 ml portions of a 5 percent sodium-bicarbonate solution (3×) and finally with 100 ml portions of water (4×). After drying and filtration the solvent was removed under reduced pressure. The residue (660 mg) was chromatographed through a column of 20 g of silicagel (eluens benzene and benzene-ether).

Yield 380 mg. Recrystallization from hexane furnished pure 17β-hydroxy-18-methyl-9β,10α-androst-4-en-3-one 17-acetate.

m.p. 121°-123.5°; $\epsilon_{242} = 15,900$ (methanol).

EXAMPLE III

17β-hydroxy-17-(2′-methallyl)-18-methyl-9β,10α-androst-4-en-3-one a. 3-pyrrolidine-18-methyl-9β,10α-androsta-3,5-dien-17-one (compound IV)

In a brown erlenmeyer flask of 50 ml 2 g of dione (compound III, Example I) dissolved in 20 ml of super dry methanol (the methanol was dried by means of refluxing with magnesium chips and iodine). The solution was refluxed for 10 minutes in a nitrogen atmosphere, then 1 ml of freshly distilled pyrrolidine was added while refluxing was continued for another 10 minutes. After refluxing the compound was seeded with crystals of the enamine of retrodione and stored at −25° during about 20 hours. After suction through a glass filter and washing with cold (−25°) super-dry methanol the enamine (compound IV) was dried at an oil-pump.

Yield 2.18 g $\epsilon_{276} = 23,500$.

b. 17β-hydroxy-17-(2′-methallyl)-18-methyl-9β,10α-androst-4-en-3-one 3.4 g of methallylchloride in 40 ml of dry ether were added to 1.5 g (55 mmol) of Mg in the course of 2 hours. The reaction was started at room-temperature with the use of 1,2-dibromoethane and during the reaction the reaction mixture was cooled in ice-water. After stirring for another 3 hours at 0° C, the Grignard-reagent was pressed in another round-bottom flask with the use of nitrogen. The strength of the Grignard-solution was determined by treating 2 ml of the solution with concentrated ammoniumchloride and measuring the volume of the formed gas. In the Grignard solution about 48 mmol of methallylmagnesiumchloride were present. To the Grignard solution 2.18 g (5.37 mmol) of the enamine (compound IV) were added at 0° and also 50 ml of dry ether. The solution was then stirred for 3 hours at 0° and for another 15 hours at room-temperature. Then the mixture was decomposed with a concentrated solution of ammoniumchloride in water. The ether was removed under reduced pressure. After removing the water, the resulting oil was washed twice with distilled water and then dissolved in 200 ml of methanol and 18 ml of a 2 n-sodiumhydroxide solution.

In a nitrogen atmosphere the solution was warmed for 1 hour at 50°. After cooling 18 ml of acetic acid was added and the methanol was removed under reduced pressure. Water was added and the solution extracted three times with a mixture of methylenechloride-petroleumether. The combined organic layers were washed with water ( 1 X); a 2n-sodiumhydroxide solution (till the organic solution was colorless) and finally with water. After drying over sodiumsulphate and filtration, the solvent was removed under reduced pressure. Residue 2.18.

After chromatography on silicagel and crystallization from acetone-n-hexane 1.4 g of the 17α-methallylcompound were isolated;

m.p. 149°–150°; $\epsilon_{240} = 16400$; $[\alpha]_D^{25} = -150°$ (c = 0, 99); (the yield of 65 percent can be raised by working up the mother liquor.

EXAMPLE IV

17α-ethynyl-17-hydroxy-18-methyl-9β,10α-androst-4-en-3-one (compound V)

Four g of lithium were dissolved in 300 ml of ethylenediamine (free of water). Through this blue solution a stream of dry acetylene (through a column of molecular sieves) was passed till the blue color disappeared. Then a solution of 4,45 g of the enamine (compound IV, Example III) in 120 ml of dry tetrahydrofuran was added in the course of 30 minutes at roomtemperature. After acetylene was passed through the solution for another 2 hours, the mixture was neutralized with 20 g of ammoniumchloride. After cooling to 0°, 250 ml of water were added. To this mixture another 1,000 ml of water were added. After standing overnight the solution was extracted with methylene-chloride. The organic layer was washed with a 2n-sulfuric acid solution, a saturated sodiumbicarbonate solution and with water. After drying and filtration the solvent was removed under reduced pressure. The residue was chromatographed on 240 g of silicagel and eluted with benzene and benzene-ether portions.

Yield 3 g. m.p. 150.5°–161.5°;
$\epsilon_{242.5} = 16.200$;
$[\alpha]_D^{25} = -218°$ (c − 1,05).

EXAMPLE V

17α-ethynyl-17-hydroxy-18-methyl-9β,10α-androsta-4,6-diene-3one

Three g of compound V (Example IV) were dissolved in 50 ml of absolute dioxan. Whilst stirring 2.7 g of DDQ in 30 ml of HCl/dioxan (containing 180 mg HCl/ml dioxan) were added to this solution. The stirring was continued for 5 minutes in a nitrogen atmosphere. Then the reaction mixture was poured out into 600 ml of a 0.5 n sodium-hydroxide solution. After extraction with 200 ml portions (3 times) of benzene/ether (1:1), the combined organic layers were washed with 2 n sodiumhydroxide solution (till the solution was colorless) and with water. After drying and filtration the solvent was removed under reduced pressure.

Yield 2.35 g crystalline material ($\epsilon_{285} = 24,000$). The compound was recrystallized from acetone-n. hexane. Physical constants of the pure compound are: m.p. 178°–179°; $[\alpha_D^{25} = -778°$ (c = 1.06 in $CHCl_3$); $\epsilon_{287} = 24,850$ (methanol).

EXAMPLE VI

17α-Ethyl-17-hydroxy-18-methyl-9β,10α-androst-4-en-3-one and
17α-ethyl-18-methyl-5α,9β,10α-androstan-17-ol-3-one A suspension of 800 mg of 5 percent palladium on calciumcarbonate in 100 ml of toluene was agitated in an atmosphere of hydrogen until no further hydrogen was absorbed. To this suspension 3.7 g of 17α-ethynyl-17-hydroxy-18-methyl-9β,10α-androsta-4,6-dien-3-one (Example V) in 100 ml of toluene were added and agitation was continued. After 50 minutes 270 ml of hydrogen were taken up ($\approx 1$ mol). The further uptake was slowly and another 800 mg of 5 percent palladium on calciumcarbonate was added. After 8 hours the reaction was terminated (570 ml had been absorbed) and the reaction mixture filtrated. The solvent was removed in vacuo and the residue (3.8 g) was chromatographed through a column of 200 g of silicagel. Two fractions were obtained namely 2 g of 17α-ethyl-17-hydroxy-18-methyl-9β,10α-androst-4-en-3-one and 1.3 g of 17α-ethyl-18-methyl-5α,9β,10α-androstan-17-ol-3-one.

Physical constants of the pure compounds are:
17α-ethyl-18-methyl-5α,9β,10α-androstan-17-ol-3-one:
m.p. 188.5° – 189.5°; $[\alpha]_D^{25} = -20°$ ( c = 1.02 in $CHCl_3$);
17α-ethyl-17-hydroxy-18-methyl-9β,10α-androst-4-ene-3-one:
m.p. 138.5° – 139°; $[\alpha]_D^{25} = -169°$ ( c = 0.92 in $CHCl_3$); $\epsilon_{242} = 15,900$ (methanol);

EXAMPLE VII

17α-ethyl-17-hydroxy-18-methyl-9β,10α-androsta-4,6-dien-3-one

Two g of 17α-ethyl-17-hydroxy-18-methyl-9β,10α-androst-4-en-3-one (Example VI) were dissolved in 33 ml of absolute dioxan. To this solution a solution of 1.8 g DDQ in 20 ml HCl/dioxan(containing 180 mg HCl/ml dioxan) was added. The solution was stirred in a nitrogen atmosphere for 5 minutes. The reaction mixture was then poured out into 400 ml of a 0.5 n sodiumhydroxide solution. After extraction with 150 ml portions (3 times) of benzene/ether the combined extracts were washed with a 2 n sodiumhydroxide solution (till the hydroxide layer was colorless) and with water. After drying and filtration the solvent was removed under reduced pressure. Yield 1.6 g of a crystalline compound which was chromatographed on 50 g of silicagel (eluens benzene/ether). Recrystallization was performed with acetone-n.hexane. Physical constants of the pure compound are: m.p. 150.5° – 151.5°; $[\alpha]_D^{25} = -652°$ (c = 0.96 in $CHCl_3$); $\epsilon_{286} = 24,600$.

EXAMPLE VIII

17α-chloroethynyl-17-hydroxy-18-methyl-9β,10α-androst-4-en-3-one

In a nitrogen atmosphere, a solution of 8.4 g of methyl-iodide in 85 ml of anhydrous ether was added slowly to a mixture of 1.9 g of lithium in 85 ml of boiling anhydrous ether. After refluxing for half an hour and subsequent cooling to 0°C, a solution of 5.4 ml of freshly distilled trans-1,2-dichloroethylene in 17 ml of dry ether was added during 30 min. The mixture was allowed to warm to room temperature and stirring was continued for 1½ hours. To the obtained solution of lithium chloroacetylide a solution of 2.3 g of 3-(1′-pyrrolidino)-18-methyl-9β,10α-androsta-3,5-dien-17-one in 17 ml of dry ether and 17 ml of dry tetrahydrofuran was added during 30 min. After standing at room temperature overnight the mixture was cooled to 0°C and then decomposed with a saturated ammoniumchloride solution. After separation of the layers, the aqueous layer was extracted with methylene-chloride. The combined organic layers were washed with water (6×) and dried over sodium-sulphate. After evaporation of the solvents the residue was chromatographed over silicagel and crystallized from ether yielding 1.2 g of 17α-chloroethynyl-17-hydroxy-18-methyl-9β,10α-androst-4-en-3-one m.p. 1995.° – 200.5°C; $\epsilon_{241.5} = 15,600$

EXAMPLE IX

17α-chloroethynyl-17-hydroxy-18-methyl-9β,10α-androsta-4,6-dien-3-one

To a solution of 540 mg 17α-chloroethynyl-17-hydroxy-18-methyl-9β,10α-androst-4-en-3-one in 8 ml of dry dioxan were added under stirring 440 mg of dichloro-dicyanobenzoquinone in 5 ml of dry dioxan containing 180 mg of hydrogenchloride per ml. After a reactiontime of 5 min, the mixture was poured out into 100 ml of a 0.5 N sodiumhydroxide solution. After separation of the layers the organic layer was washed with a 2N sodiumhydroxide solution and with water. Removal of the solvent and chromatography of the residue gave after crystallization 300 mg of 17α-chloroethynyl-17-hydroxy-18-methyl-9β,10α-androsta-4,6-dien-3-one: m.p. 201°–202° C; $\epsilon_{287} = 22,300$.

EXAMPLE X

17α-18-Dimethyl-17-hydroxy-19β,10α-androst-4-en-3-one 1. 3-Pyrrolidino-18-methyl-9β,10α-androsta-3,5-dien-17-one To a boiling solution of 18-methyl-9β,10α-androst-4-ene-3,17-dione in 20 ml of superdry methanol was added 1 ml of freshly distilled pyrrolidine and refluxing was continued for 10 minutes. The reaction mixture was cooled and crystallized at −25°C. Suction of the crystalline product and washing with superdry methanol yielded after drying at an oil pump 2.18 g of 3-pyrrolidino-18-methyl-9β,10α-androsta-3,5-dien-17-one; $\epsilon_{276}$=23,500.

2. 17α,18-Dimethyl-17-hydroxy-9β,10α-androst-4-en-3-one

In a nitrogen atmosphere was added dropwise to a stirred mixture of 910 mg of lithium in 35 ml of dry ether and 0.4 ml of methyliodide a solution of 3.6 ml of methyliodide in 30 ml of dry ether. After stirring for another 30 minutes the reaction mixture was filtered in an atmosphere of nitrogen. To the so obtained filtrate was dropped a solution of 2.2 g of 3-pyrrolidino-18-methyl-9β,10α-androsta-3,5-dien-17-one in a mixture of 12.5 ml of dry tetrahydrofuran and 12.5 ml of dry ether. After stirring 16 hrs at room temperature the excess of methyllithium was decomposed by cautious addition of 250 ml of water at 0° C. The layers were separated and the aqueous layer was extracted with 3 portions of 100 ml of ether. The combined organic layers were washed with water and dried over sodiumsulfate. After removing of the solvent the residue was dissolved in 110 ml of methanol and 15 ml of a 2N sodiumhydroxide solution and then refluxed for 1 hour. After neutralizing the solution with acetic acid the solvent was removed in vacuo. The residue was taken up in 400 ml of ether, washed with water and dried over sodiumsulfate. After removing of the solvent the residue was chromatographed over a column of silicagel and finally crystallized from acetone. In this manner pure 17α,18-dimethyl-17-hydroxy-9β,10α-androst-4-en-3-one was obtained; mp. 162°–164° C.

EXAMPLE XI

17α-Vinyl-17-hydroxy-18-methyl-9β,10α-androst-4-en-3-one

A suspension of 800 mg of a 5percent-Palladium on calciumcarbonate catalyst in 30 ml of freshly distilled pyridine was vigorously stirred in a hydrogen atmosphere. When no more hydrogen was taken up a solution of 800 mg of 17α-ethynyl-17-hydroxy-18-methyl-9β,10α-androst-4-en-3-one in 30 ml of freshly distilled pyridine was added. After an uptake of 54.4 ml of hydrogen the reaction mixture was filtered, the solvent was distilled off in vacuo and residue was crystallized from acetone. Recrystallization from acetone gave pure 17α-vinyl-17-hydroxy-18-methyl-9β,10α-androst-4-en-3-one; m.p. 137°–138°C.

EXAMPLE XII

17α-Allyl-17-hydroxy-18-methyl-9β,10α-androst-4-en-3-one

To a filtered Grignard reagent from 7 g of allylchloride and 4 g of magnesium were added 4.5 g of the enamine described in X 1. dissolved in 60 ml of dry ether. After stirring 3 hrs at 0° C and 15 hours at room temperature the reaction mixture was decomposed by the addition of a saturated solution of ammonium chloride. The mixture was extracted with methylene chloride. The solvents were removed under reduced pressure and the residue was dissolved in 250 ml of methanol and 18 ml of a 2N solution of sodiumhydroxide. This solution was heated for 1 hour at 50° C. After cooling 20 ml of acetic acid were added and the solvents were removed under reduced pressure. The so obtained residue was taken up in methylene chloride and was washed with water a 2N solution of sodiumhydroxide and water and was finally dried over sodiumsulfate. After removing of the solvents and chromatography on silicagel pure 17α-allyl-17-hydroxy-18-methyl-9β,10α-androst-4-en-3-one crystallized from acetone-n.hexane; m.p. 122.5°–123.5° C.

EXAMPLE XIII

17β-Hydroxy-17-(2'-methallyl)-18-methyl-9β,10α-androsta-4,6-dien-3-one

A mixture of 19 1 g of 17β-hydroxy-17-(2'-methallyl)-18-methyl-9β,10α-androst-4-en-3-one in 13 ml of dioxan-HCl (containing 65 mg HCl/ml) and 0.83 g of DDQ in 13 ml of the same dioxan-HCl solution was stirred for 5 minutes at room temperature in an atmosphere of nitrogen. The reaction mixture was poured out into 1–1 of ice-water. Extraction with 3-portions of 250 ml of a benzene-ether (1:1) mixture was followed by washing with cold 1N sodiumhydroxide solution and water. After drying the organic layer over sodiumsulfate and evaporation of the solvents the compound was purified by chromatography on silicagel and crystallization from acetone-n.hexane. Recrystallization from the same solvents gave pure 17β-hydroxy-17-(2'-methallyl)-18-methyl-9β,10α-androsta-4,6-dien-3-one; m.p. 140.5°–141° C.

EXAMPLE XIV

17β-Hydroxy-18-methyl-9β,10α-androsta-4,6-dien-3-one 1. 18-Methyl-9β,10α-androsta-4,6-diene-3,17-dione.

According to the procedure described in XIII 18-methyl-9β,10α-androst-4-en-3,17-dione was converted into 18-methyl-9β,10α-androsta-4,6-dien-3,17-dione. Crystallization from acetone gave a compound with m.p. 163°–164° C.

2. 17β-Hydroxy-18-methyl-9β,10α-androsta-4,6-dien-3-one

A solution of 1.5 g of 18-methyl-9β,10α-androsta-4,6-diene-3,17-dione in 30 ml of dry tetrahydrofuran was added dropwise to a suspension of 525 mg of lithiumaluminumhydride in 15 ml of dry tetrahydrofuran. After refluxing for 1 hour the reaction mixture was cooled and the excess of lithiumaluminumhydride was decomposed with 10 ml of ethylacetate. To this mixture 20 ml of a saturated solution of sodiumsulfate and 50 g of sodiumsulfate (solid) were added. After filtration the solvents were removed under reduced pressure to yield 1.53 g of resinous 18-methyl-9β,10α-androsta-4,6-diene-3,17-diol. This resin was dissolved in 25 ml of dry dioxan and 110 ml of dry benzene and was then added to a solution of 165 g of DDQ in 100 ml of dry benzene. After a reaction-time of 7 hours (room-temperature) the reaction mixture was poured out into 1–1 of ice-water. The organic layer was separated off and the aqueous layer was extracted with benzene-ether (1:1). The combined organic layers were washed with water, a cold 1N solution of sodiumhydroxide and water and were finally dried over sodiumsulfate. After removing of the solvents the residue was chromatographed over a column of silicagel and crystallized from acetone-n.hexane yielding pure 17β-hydroxy-18-methyl-9β,10α-androst-4,6-dien-3-one; m.p. 123°–125 ° C.

EXAMPLE XV

6-Chloro-17β-hydroxy-18-methyl-9β,10α-androsta-4,6-dien-3-one 17-acetate 1. 18-Methyl-9β,10α-androsta-3,5-diene-3,17β-diol 3,17-diacetate Eight g of 17-hydroxy-18-methyl-9β,10α-androst-4-en-3-one were dissolved in 40 ml of freshly distilled isopropenyl acetate and 0.05 ml of concentrated sulfuric acid. This mixture was refluxed for 3 hours in a nitrogen atmosphere. After cooling to 0° C 0.5g of sodiumbicarbonate and 0.8 ml of dry pyridine were added. The mixture was filtered over sodiumsulfate and the solvents were removed under reduced pressure. Crystallizing the residue from methanol-1 percent pyridine gave pure 18-methyl-9β,10α-androsta-3,5-diene-3,17-diol 3,17-diacetate $\epsilon_{234.5} = 18.100$.

2. 6-Chloro-17β-hydroxy-18-methyl-9β,10α-androst-4-en-3-one 17-acetate

A solution of 8.7 g of 18-methyl-9β,10α-androsta-3,5-diene-3,17-diol 3,17-diacetate in 150 ml of ether was added at 0° C to a solution of 15 g of dry potassium acetate in 450 ml of 85 percent acetic acid. To the stirred mixture was added slowly 50 ml of a solution of chlorine in acetic acid (containing 35.2 mg $Cl_2$/ml) and stirring was continued for 15 min. The reaction mixture was poured out into 2 l of water. After extraction with methylenechloride the organic layer was washed with water, a saturated sodiumbicarbonate solution and water and was finally dried over sodiumsulfate. Removing of the solvent under reduced pressure gave a crystalline product: 6-chloro-17β-hydroxy-18-methyl-9β,10α-androst-4-en-3-one 17-acetate.

3. 3-Ethoxy-6-chloro-18-methyl-9β,10α-androsta-3,5-dien-17β-ol 17-acetate

To a solution of 4 g of 6-chloro-17β-hydroxy-18-methyl-9β,10α-androst-4-en-3-one 17-acetate in 80 ml of dry dioxan were added 4 ml of freshly distilled ethylorthoformate and 160 mg of dry p.toluenesulfonic acid. After a reaction time of 18 hrs the starting material was completely converted to 3-ethoxy-6-chloro-18-methyl-9β,10α-androsta-3,5-dien-17β-ol 17-acetate.

4. 6-Chloro-17β-hydroxy-18-Methyl-9β,10α-androsta-4,6-dien-3-one 17-acetate

The in XV3, mentioned solution of 3-ethoxy-6-chloro-18-methyl-9β,10α-androsta-3,5-dien-17β-ol 17-acetate was slowly dropped to a stirred suspension of 16.7 g of manganese dioxide in 167 ml of acetic acid and 16.7 ml of water. After stirring for 30 min no starting material was present and the reaction mixture was filtered, whereas the residue was washed thoroughly with acetic acid and ether. The filtrate was poured out into 1-1 of water. The aqueous layer was extracted with methylene chloride and the combined organic layers were washed successively with water, a 5 percent solution of sodium-carbonate and with water and were finally dried over sodiumsulfate. After removing of the solvents the residue was chromatographed on silicagel and crystallized from ether. Recrystallization from ether-methylene chloride gave pure 6-chloro-17β-hydroxy-18-methyl-9β,10α-androsta-4,6-dien-3-one 17-acetate; m.p. 180.5°–181.5° C.

EXAMPLE XVI

6-Chloro-17β-hydroxy-18-methyl-9β,10α-androsta-1,4,6-trien-3-one 17-acetate 1.5 g of 6-chloro-17β-hydroxy-18-methyl-9β,10α-androsta-4,6-dien-3-one 17-acetate and 1.27 g of DDQ were dissolved in 50 ml of a dioxan-HCl solution containing 1 mg HCl/ml. After stirring 90 min. at room temperature under an atmosphere of nitrogen 0.5 g of calcium-carbonate were added and stirring was continued for 30 min. The filtered reaction mixture was refluxed for 90 min. in a nitrogen atmosphere. After removing the solvents the residue was dissolved in methylene chloride and washed with water, a 1N solution of sodium-hydroxide and water and was finally dried over sodiumsulfate. The solution was filtered and the solvents were evaporated under reduced pressure. The residue was chromatographed over a column of silicagel and crystallized from acetone-n.hexane giving pure 6-chloro-17β-hydroxy-18-methyl-9β,10α-androsta-1,4,6-trien-3-one 17-acetate; m.p. 157°–157.5°.

EXAMPLE XVII 6,6-Ethylene-17β-hydroxy-18-methyl-9β,10α-androst-4-en-3-one 17-acetate 1. 6β-Trichloromethyl-17β-hydroxy-18-methyl-9β,10α-androst-4-en-3-one 17-acetate According to the method described in XV 3. 5 g of 17β-hydroxy-18-methyl-9β,10α-androst-4-en-3-one 17-acetate were converted into 3-ethoxy-18-methyl-9β,10α-androsta-3,5-dien-17β-ol 17-acetate. To this reaction mixture were added 2.4 ml of dry pyridine and 9 g of freshly distilled trichloromonobromomethane. This mixture was in a nitrogen atmosphere during 7 days exposured to the daylight. After this time the formed complex of pyridine-hydrogen bromide-trichloromonobromomethane was filtered off and the filtrate was diluted with 1-1 of a 2N hydrochloric acid solution. After extraction with methylene-chloride (3×150 ml) the organic layer was washed successively with water, a 5 percent solution of sodiumbicarbonate and water and was finally dried over sodiumsulfate. Chromatography over silicagel gave a pure compound, according to I.R. and N.M.R.-measurements, being the 6β-trichloromethyl-17β-hydroxy-18-methyl-9β,10α-androst-4-en-3-one 17-acetate.

2. 6-Methylene-17β-hydroxy-18-methyl-9β,10α-androst-4-en-3-one 17-acetate

To a solution of 30 g of chromic chloride in 210 ml of ethanol and 45 ml of concentrated hydrochloric acid were added at room temperature in an atmosphere of nitrogen 25 g of zinc wool. After a reaction time of 4 hrs the reaction mixture was pressed over with nitrogen in a dropping funnel and was then added slowly to a solution of 4.2 g of 6β-trichloromethyl-17β-hydroxy-18-methyl-9β,10α-androst-4-en-3-one 17-acetate in 60 ml of dry tetrahydrofuran. Stirring was continued for one hour. The reaction mixture was poured out into 4 of ice-water and extracted with 3 portions of 400 ml of ether. The combined organic extracts were washed with water and dried over sodiumsulfate. The solvent was removed under reduced pressure and the residue was chromatographed on silicagel. After crystallization from acetone pure 6-methylene-17β-hydroxy-18-methyl-9β,10α-androst-4-en-3-one 17-acetate was obtained; $\epsilon_{256} = 9.250$.

3. 6,6-Ethylene-17β-hydroxy-18-methyl-9β10α-androst-4-en-3-one 17-acetate

A mixture of 1.06 g of trimethylsulfoxonium iodide in 17.5 ml of dimethyl-sulfoxide and 235 mg of sodiumhydride was stirred for 15 min. at room temperature. After filtration the filtrate was added to a solution of 1.6 g of 6-methylene-17β-hydroxy-18-methyl-9β,10α-androst-4-en-3-one 17-acetate in 25 ml of dimethyl-sulfoxide. This mixture was stirred for 45 min. at room temperature and then for 1 hour at 55° C. After cooling the reaction mixture was poured out into 250 ml of icewater and was then extracted with 3 portions of 150 ml of ether. The organic layer was washed with water and dried over sodium sulfate. Removing of the solvent under reduced pressure followed by chromatography on silicagel and crystallization from ether gave pure 6,6-ethylene-17β-hydroxy-18-methyl-9β,10α-androst-4-en-3-one 17-acetate with m.p. 160.5°–161.5° C and $\epsilon_{253}$ = 12.500.

EXAMPLE XVIII

6α,18-dimethyl-17β-hydroxy-9β,10α-androst-4-en-3-one 17-acetate

Enoletherification of 17β-hydroxy-18-methyl-9β,10α-androst-4-en-3-one 17-acetate was carried out with ethylorthoformate in dioxan in the presence of p-toluene-sulphonic acid as a catalyst. Without isolation the enolether formed was treated with tetrabromomethane and pyridine. After standing at room temperature in daylight for 10 days the 6-tribromomethyl compound was obtained. The corresponding 3-oxo-4-dehydro-6-dibromomethylene compound was prepared by reacting the 6-tribromomethyl compound with a boiling solution of sodium hydroxide in methanol.

Selective hydrogenation of the 6-dibromoethylene compound to 6α,18-dimethyl-17β-hydroxy-9β,10α-androst-4-en-3-one 17-acetate was effected with palladium-strontium carbonate catalyst in 2-methoxy-ethanol in the presence of triethylamine.

EXAMPLE XIX 18-methyl-9β,10α-androsta-2,4,6-triene-3,17β-diol 3,17-diacetate

A mixture of two drops of concentrated sulphuric acid, 12.5 ml of freshly distilled isopropenylacetate and 2.5 g of 18-methyl-17β-hydroxy-9β,10α-androsta-4,6-dien-3-one was heated at reflux-temperature in a nitrogen atmosphere under exclusion of moisture for 2 hours. Work-up yielded 18-methyl-9β,10α-androsta-2,4,6-trien-3,17β-diol 3,17-diacetate.

EXAMPLE XX 6-chloro-18-methyl-9β,10α-androsta-2,4,6-triene-3,17β-diol 3,17-diacetate A solution of 1.9 g of 6-chloro-17β-hydroxy-18-methyl-9β,10α-androsta-4,6-dien-3-one 17-acetate in 26 ml of acetic anhydride, 10 ml of acetylchloride and 1.1 ml of pyridine was heated at ≈95° in a nitrogen atmosphere for 3 hours. Work-up afforded 6-chloro-18-methyl-9β,10α-androsta-2,4,6-triene-3,17β-diol 3,17-diacetate.

EXAMPLE XXI 6-fluoro-17β-hydroxy-18-methyl-9β,10α-androsta-1,4,6-trien-3-one

Fluorination of 18-methyl-9β,10α-androsta-3,5-diene-3,17β-diol 3,17-diacetate in aqueous dioxan with perchloryl fluoride gave 6α- and 6β-fluoro-17β-hydroxy-18-methyl-9β,10α-androst-4-en-3-one 17-acetate. The mixture of these compounds was enoletherified with ethylorthoformate in dioxan in the presence of p-toluene sulphonic acid. After standing overnight to this mixture was added at 0° acetone, a sodium acetate solution in water, N-bromosuccinimide and acetic acid in the sequence given. The thus obtained 3-oxo-4-dehydro-6-fluoro-6-bromo compound was after work-up dehydrobrominated by heating in pyridine at 90° for 45 minutes to yield 6-fluoro-17β-hydroxy-18-methyl-9β,10α-androsta-4,6-dien-3-one 17-acetate.

Treatment of this compound with DDQ in dioxan in the presence of hydrogen chloride (1 mg/ml) at room temperature for 1½ hour, followed by neutralization with calcium carbonate, filtration and heating of the filtrate at reflux temperature for 1½ hour gave after work-up 6-fluoro-17β-hydroxy-18-methyl-9β,10α-androsta-1,4,6-trien-3-one 17-acetate.

EXAMPLE XXII 6-fluoro-18-methyl-9β,10α-androsta-2,4,6-triene-3,17β-diol 3,17-diacetate Enolesterification of 6-fluoro-17β-hydroxy-18-methyl-9β,10α-androsta-4,6-dien-3-one 17-acetate as described in example XX resulted in the formation of 6-fluoro-18-methyl-9β,10α-androsta-2,4,6-triene-3,17β-diol 3,17-diacetate.

EXAMPLE XXIII

6-Chloro-17α-ethynyl-17-hydroxy-18-methyl-9β,10α-androsta-1,4,6-trien-3-one 17-acetate 17α-ethynyl-17-hydroxy-18-methyl-9β,10α-androst-4-en-3-one was treated with isopropenylacetate in the presence of sulphuric acid as described in example XV to form the corresponding 3,17-diacetate. According to the method described in the same example this compound was subsequently converted to the 6-chloro-4-en-3-one, the 3-ethoxy-6-chloro-3,5-diene and finally by treatment with manganese dioxide to 6-chloro-17α-ethynyl-17-hydroxy-18-methyl-9β,10α-androsta-4,6-dien-3-one 17-acetate.

1-Dehydrogenation with DDQ as described in example XXI provided 6-chloro-17α-ethynyl-17-hydroxy-18-methyl-9β,10α-androsta-1,4,6-trien-3-one 17-acetate.

EXAMPLE XXIV 6-chloro-18-methyl-9β,10α-androsta-2,4,6-trien-17β-ol

A solution of 6-chloro-17β-hydroxy-18-methyl-9β,10α-androsta-4,6-dien-3-one 17-acetate in waterfree tetrahydrofuran was provided with lithium aluminiumhydride, after which the mixture was stirred at room temperature for 1½ hour. Treatment of the thus obtained 3α-hydroxy compound with hydrochloric acid in a mixture of ethanol and tetrachloromethane at reflux-temperature for half an hour produced 6-chloro-18-methyl-9β,10α-androsta-2,4,6-trien-17β-ol.

EXAMPLE XXV

Two g of 17α-ethynyl-17-hydroxy-18-methyl-9β,10α-androstu4-en-3-one were dissolved in chloroform, which solution was mixed homogeneously with 194 g of lactose. The mixture was dried at 40° C during 1 hour. The mixture was wettened with a 10 percent-ic aqueous solution of 2 g of gelatine and subsequently ground through a 20 mesh sieve. The mixture was dried at 40° C during 24 hours, whereupon the granules were ground through a 20 mesh sieve. The mixture was weighed and then had added to it proportional amounts of talcum venetum and magnesium stearate in amounts of optimal 25 mg and 2 mg respectively. The resulting mixture was homogenized and worked to tablets of 225 mg each.

EXAMPLE XXVI

Injection liquids of 17α-ethynyl-17-hydroxy-18-methyl-9β,10α-androst-4-en3-one (active ingredient) were made as follows:

5.00 g of the active ingredient were dissolved in 90 mls of a solution of 2% w/v benzylalcohol and 46% w/v benzylbenzoate in ricinic oil at a temperature of 60°C. The solution was cooled to room temperature and replinished to 100 mls with the ricinic oil solution aforesaid. The mixture was homogenized by stirring and filtrated. Ampouls and vials were filled with the filtrated solution, subsequently sealed and then sterilized by heating for 1 hour at 120°.

I claim:

1. A compound selected from the group consisting of the 9β, 10α steroids of the formulas

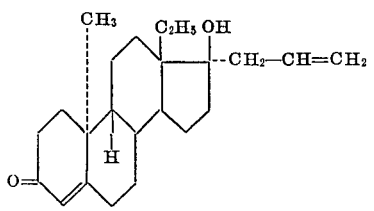

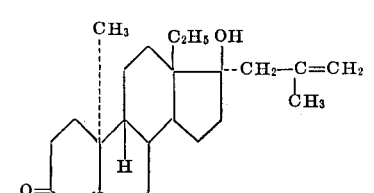

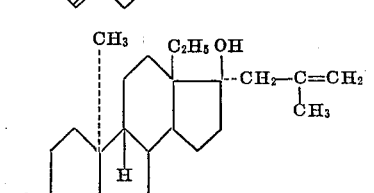

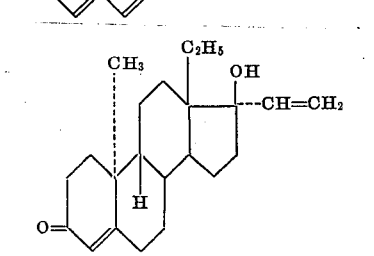

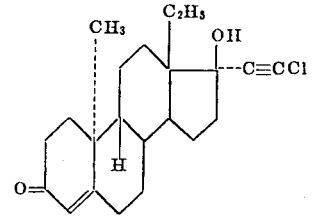

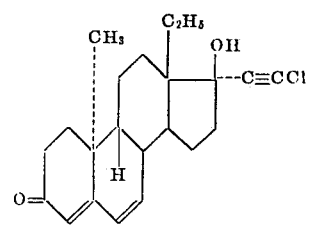

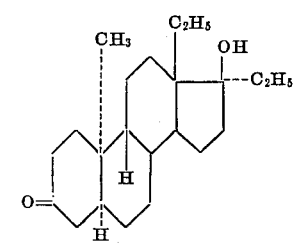

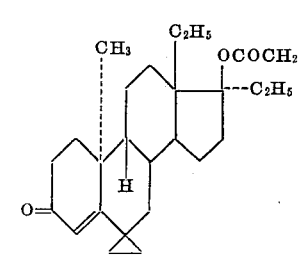

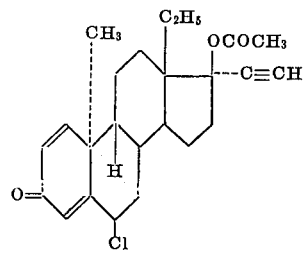

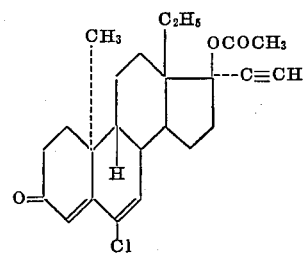

2. A compound of claim 1 of the formula

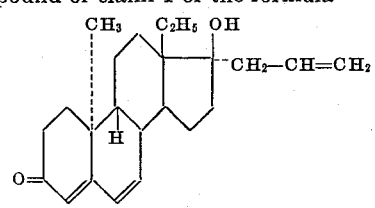

3. A compound of claim 1 of the formula
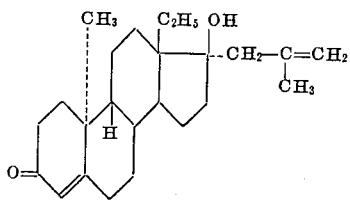
4. A compound of claim 1 of the formula
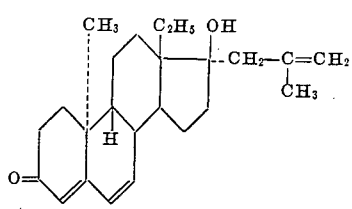
5. A compound of claim 1 of the formula
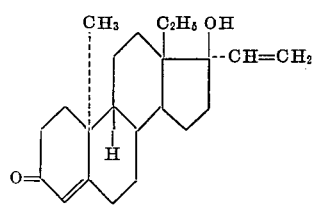
6. A compound of claim 1 of the formula
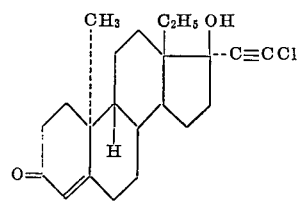
7. A compound of claim 1 of the formula
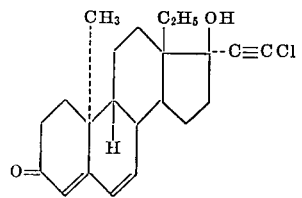
8. A compound of claim 1 of the formula
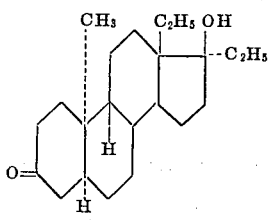
9. A compound of claim 1 of the formula
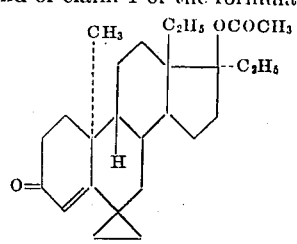
10. A compound of claim 1 of the formula
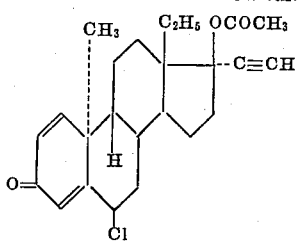
11. A compound of claim 1 of the formula
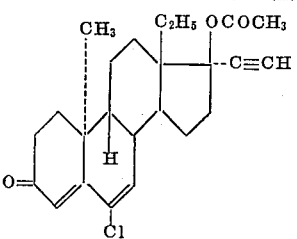
* * * * *